United States Patent
Blaser et al.

(10) Patent No.: US 7,847,215 B2
(45) Date of Patent: Dec. 7, 2010

(54) JET TRAPPING IN A CUTTING BEAM PROCESSING MACHINE

(75) Inventors: Martin Blaser, Vogt (DE); Martin Petera, Sindelfingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 329 days.

(21) Appl. No.: 12/043,369

(22) Filed: Mar. 6, 2008

(65) Prior Publication Data
US 2008/0225398 A1 Sep. 18, 2008

Related U.S. Application Data

(63) Continuation of application No. PCT/EP2005/009540, filed on Sep. 6, 2005.

(51) Int. Cl.
*B23K 26/16* (2006.01)
*B23K 26/42* (2006.01)
*B23K 26/38* (2006.01)

(52) U.S. Cl. .............. 219/121.67; 219/121.72; 219/121.82

(58) Field of Classification Search ............ 219/121.67, 219/121.72, 121.82, 121.78, 121.8; 359/614, 359/601
See application file for complete search history.

(56) References Cited

U.S. PATENT DOCUMENTS 3,889,095 A * 6/1975 Egan ............... 219/121.82

2004/0020511 A1 * 2/2004 Sandhu et al. ........... 134/1

FOREIGN PATENT DOCUMENTS

| DE | 4319790 A | * | 11/1994 |
| JP | 58103990 A | * | 6/1983 |
| JP | 61-20680 A | * | 1/1986 |
| JP | 61-189896 A | * | 8/1986 |
| JP | 62-40985 A | * | 2/1987 |
| JP | 2-165885 | * | 6/1990 |
| JP | 04-091884 | | 3/1992 |
| JP | 08-108291 A | * | 4/1996 |
| JP | 10-76387 A | * | 3/1998 |
| JP | 2000-237891 A | * | 9/2000 |
| WO | WO 90/00952 | | 2/1990 |

OTHER PUBLICATIONS machine translation of Japan Patent No. 8-108,291, Apr. 2010.*
machine translation of Japan Patent No. 10-76,387, Apr. 2010.*
machine translation of Japan Patent No. 2000-237,891.*
International Search Report from corresponding PCT Application No. PCT/EP2005/009540, mailed May 30, 2006, 4 pages.

* cited by examiner

*Primary Examiner*—Geoffrey S Evans
(74) *Attorney, Agent, or Firm*—Fish & Richardson P.C.

(57) ABSTRACT

A beam-catching device is provided for a cutting-beam processing machine configured to deliver a cutting beam to a workpiece. The beam-catching device includes a housing which has a line-like opening pointing toward the cutting beam, the cutting beam discharging from the underside of the workpiece during processing of the workpiece and entering the housing through the opening, and a solid medium disposed within the housing and configured to move relative to the opening of the housing in a direction crossing the cutting beam in order to absorb energy.

21 Claims, 4 Drawing Sheets

JET TRAPPING IN A CUTTING BEAM PROCESSING MACHINE

CROSS REFERENCE TO RELATED APPLICATION

This application is a continuation of and claims priority under 35 U.S.C. §120 to PCT Application No. PCT/EP2005/009540, filed on Sep. 6, 2005. The contents of this priority application is hereby incorporated by reference in its entirety.

TECHNICAL FIELD

This invention relates to a cutting beam-catching device for a processing machine.

BACKGROUND

JP 4-91884 discloses a processing machine in which a workpiece is arranged on a workpiece support for processing. This workpiece is moved via the workpiece support transversely to a processing direction of a cutting head. To process the workpiece, a cutting beam is directed onto the workpiece, the cutting beam discharging on the underside during the processing of the workpiece. Assigned as a beam-catching device to this discharge region is a housing having an opening through which the cutting beam discharging at the bottom enters the housing. The opening and the housing extend along the working region of the cutting head.

This beam-catching device has the disadvantage that the cutting beam, in particular a laser beam or flame cutting jet, received by the housing and discharging at the bottom from the workpiece during the processing is not completely absorbed. Furthermore, the cutting beam may be affected by beam reflections and by slag, sparks or remnants which have not been removed. In addition, on account of the energy received in the housing and not yet absorbed, slag, dust and/or burn-off residue may adhere in the beam-catching device.

SUMMARY

The object of the invention is therefore to provide a beam-catching device for such processing machines which process the workpiece with a cutting beam, by means of which beam-catching device at least high energy absorption of the cutting beam, which is caught by the beam-catching device, is made possible.

High energy absorption of the cutting beam is achieved by the configuration of the beam-catching device disclosed herein, in which a solid medium which moves relative to the opening and crosses the cutting beam is provided in the housing. As a result, heating of the workpiece supports in the machine bed of the processing machine can be considerably reduced. In addition, damage to the beam-catching device is prevented.

According to a preferred configuration of the invention, provision is made for the moving medium to be designed as a circulating band. This makes possible the removal of burn-off residue, slag and dust in addition to the entrained energy. The circulating band can provide for continuous energy absorption of the beam entering the opening of the housing. At the same time, the circulating band can prevent a situation in which local heating in the housing occurs even with a uniform processing position of the cutting beam. In addition, damage to the housing wall caused by the caught beam can be avoided.

According to a preferred configuration, provision is made for the band to be made of a material which is a good conductor of heat. As a result, the energy received in the band can be distributed and drawn off quickly and uniformly. In addition, spot-like overheating is prevented.

According to a further advantageous configuration of the invention, provision is made for the band to be designed as a metal band, as a metallic chain or as a metallic, mesh-like fabric. This enables a long service life and high robustness to be achieved, good thermal conductivity being ensured.

A structured surface is preferably provided in the case of a planar band, which structured surface, preferably dulled and slightly etched, has an embossed structure or a corrugated or fluted surface. As a result, the surface is enlarged for the energy absorption. In addition, spreading of the striking cutting beam can be achieved, since a diffuse beam reflection is effected.

According to a preferred embodiment, the circulating band is provided below the opening of the housing and extends at least partly along the opening. An arrangement of compact construction can thus be provided. At the same time, high energy absorption is made possible even in the case of a slightly expanding cutting beam. The circulating band preferably extends along the length of the opening of the housing. As a result, the entire processing region of the cutting head can be covered by a circulating band.

Alternatively, provision may be made for a plurality of individual circulating bands, which can also partly engage one inside the other, to be arranged along the opening of the housing for the energy absorption of the cutting beam.

According to a further preferred embodiment, provision is made for the circulating band to be oriented essentially parallel to the opening of the housing and for it to comprise a running direction which is parallel to the direction of movement of the cutting head. As a result, a narrow and elongated band can be provided in the beam-catching device, such that there is a longer circulating time until a striking point on the circulating band is again positioned below the cutting head. Alternatively, provision may be made for the circulating band to comprise a direction of movement transversely to the longitudinal extent of the opening of the housing. As a result, a very wide band, which, however, is designed to be short in length and which is held essentially by two deflection rollers, can be used.

The circulating band, which is oriented essentially parallel to the direction of movement of the cutting head, is driven in a running direction against the direction of movement of the cutting head. This ensures that high energy absorption is effected and that further constituents which are received by the housing are drawn off. At the same time, it is ensured that the circulating band does not stop relative to the cutting beam in order to avoid damage to the band.

According to a further alternative configuration of the invention, provision is made for the circulating band, which is oriented essentially parallel to the direction of movement of the cutting head, to be driven in a running direction which corresponds to the direction of movement of the cutting head, the band speed being greater than, preferably twice as great as, the traverse speed of the cutting head. As a result, in a similar manner to the opposed running direction of the band, the same effect can be achieved.

According to a further advantageous embodiment of the invention, provision is made for the circulating band to be inclined in at least one spatial direction relative to the cutting beam striking the circulating band. This can achieve a beam reflection deviating from the angle of incidence. This leads to spreading at a wall section of the housing, as a result of which further energy absorption can be achieved. This wall section can be cooled or designed as a beam trap.

According to a first alternative configuration of an inclined band, provision is made for the circulating band to have a gradient or a slope in or against the transport direction. Alternatively, provision may be made for the circulating band, in an essentially parallel orientation of the housing, to be tilted laterally relative to a vertically incoming cutting beam. Analogous embodiments also apply to a running direction of the circulating band transversely to the direction of movement of the cutting head. Furthermore, the aforesaid alternatives may also be superimposed. Back reflection of the cutting beam to the cutting head can be prevented by the tilting of the transport band.

Provision is preferably made for the housing to have at least one extraction opening, to which an extraction device can be attached. As a result, the vapors produced during the processing and the energy absorption can be extracted. At the same time, cooling can thus be achieved by ambient air being drawn in via the opening, said ambient air being directed along the circulating band or flowing around the circulating band.

Furthermore, provision is advantageously made for the housing to comprise at least one compressed-air feed, which is preferably provided at a large distance from the extraction means. Specific regions of the circulating band can be cooled especially effectively by such a compressed-air feed. At the same time, this also enables constituents resting on the circulating band, such as, for example, burn-off residue, slag or dust, to be blown off, such that a cleaning effect is achieved.

The compressed-air feed is preferably effected against the running direction of the circulating band. As a result, counterflow cooling can be achieved. This compressed-air feed may also be integrated in the circulating band, such that cooling not only of individual regions but also along an entire track section is made possible.

According to an advantageous configuration of the invention, the circulating band is guided at the respective end by a deflection roller which has a small deflection radius. As a result, a self-cleaning effect of any adhering slag can be achieved. Due to the bending of the band on a small radius, the brittle slag breaks starting from a certain thickness and automatically comes off the band.

A collecting device which forms a "parts or slag sump" is advantageously provided at least at one end, advantageously at both ends, of the circulating band. As a result, the drive direction may be optional. The parts/slag sump may preferably also extend continuously below the circulating band.

An advantageous development of the invention provides for a brush, a scraper or a slide to be provided on the running band, said brush, scraper or slide acting on the surface of the band. This assists the cleaning of the band material, such that prolonged use of the band is made possible.

According to a further advantageous configuration of the invention, provision is made for a first bristle strip to be provided at least in sections along a longitudinal edge of the circulating band, said first bristle strip having a small number of bristles per surface, and arranged opposite said first bristle strip at the other longitudinal edge of the band is a bristle strip which extends at least in sections and has a large number of bristles per surface. As a result, specific air conduction during the extraction in the interior space of the housing is achieved, a cooling effect being achieved at the same time. At the same time, a flow transversely to the running direction of a band oriented parallel to the opening of the housing is achieved, as a result of which the cooling or the cooling effect is increased. In addition, guiding elements may be provided, such that the extraction air is passed through between the advancing and the returning band section. The entire band can therefore be cooled.

According to an advantageous configuration of the invention, provision is made for wall sections between the opening of the housing and the circulating band to have integrated cooling, in particular water cooling. This makes possible additional energy absorption of the reflected cutting beam. In particular in the case of an angular position or inclination or tilting of the band, especially intense cooling can be provided at the wall section which faces the angle of emergence of the reflected beam.

According to an embodiment of the invention, the circulating band is guided by rollers guided between deflection rollers and is tensioned via at least one tensioning roller. This can ensure, as a function of the energy received, that there is sufficient band tension in order to permit reliable operation. Alternatively, provision may be made for one of the guide rollers to be designed to be traversable synchronously with the cutting head, wherein the guide roller tilts a band section between the two deflection rollers. The band speed of the circulating band can be effected in accordance with the previous design options. This embodiment constitutes an alternative configuration for tilting the entire running band.

The details of one or more embodiments of the invention are set forth in the accompanying drawings and the description below. Other features and advantages of the invention will be apparent from the description and drawings, and from the claims.

DETAILED DESCRIPTION

Figure 1:
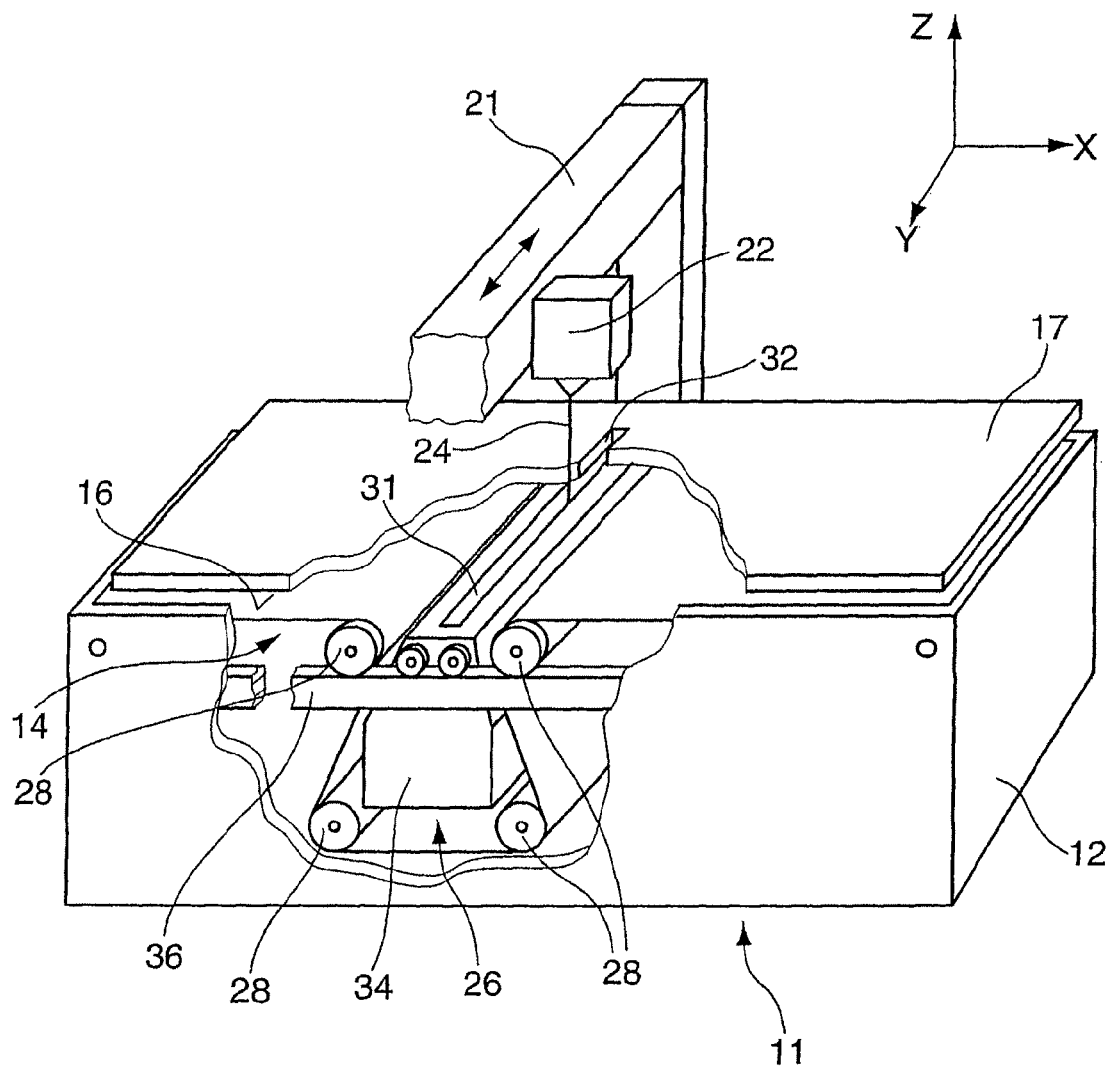
FIG. 1 shows a perspective illustration of a processing machine with a beam-catching device in the installed position.

A processing machine 11 is shown in perspective in FIG. 1. This processing machine 11 is preferably designed as a laser cutting machine. Alternatively, a processing machine having a plasma beam or a flame cutting jet may be provided. A machine bed 12 comprises a workpiece support 14, which, for example according to FIG. 1, is formed by a supporting band 16 which is held statically in the machine bed 12. In an alternative embodiment, this supporting band may also be driven and may additionally perform transport functions. A cutting head 22 is movable in the Y direction via a line-like axis 21 and forms a working region of the cutting head 22. In addition, a line-like axis which is traversable in and against an X direction may be provided. Furthermore, a vertically traversable line-like axis (Z axis) may also be provided. A cutting beam 24 is directed from the cutting head 22 onto the workpiece 17 in order to carry out processing.

At an underside of the workpiece 17, a beam-catching device 26 which is positioned between deflection rollers 28 of the supporting band 16 is provided in the processing region of the cutting head 22. In a special embodiment, the beam-catching device 26 can be traversable on a guide 36 in and against the X direction, in which case the beam-catching device 26 is coupled to the movement of the cutting head 22, for example it is carried along by a separate drive or without a separate drive.

The beam-catching device 26 has an opening 31 which is directed toward the cutting head 22 and extends in the Y direction preferably along the entire processing region of the cutting head 22. During the processing of the workpiece 17, the cutting beam 24, which discharges on the underside of the workpiece 17 after incorporation of a cutting gap 32, can be caught by the opening 31 of a housing 34 of the beam-catching device 26.

Figure 2:
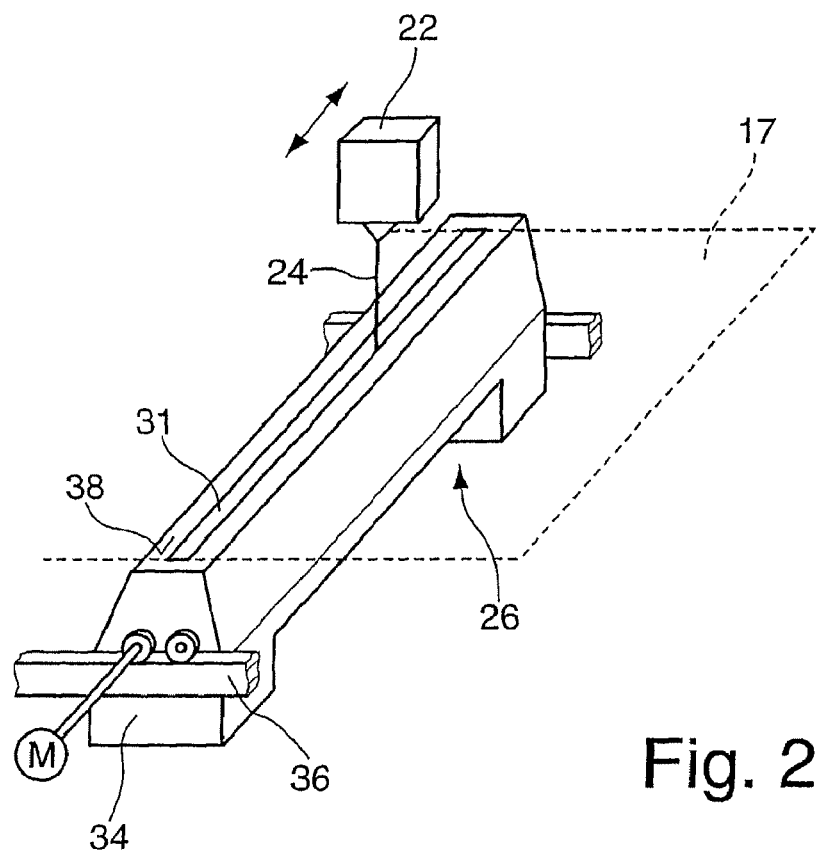
FIG. 2 shows a perspective illustration of the beam-catching device according to the invention.

A perspective view of the beam-catching device 26 is shown in FIG. 2. Said beam-catching device has an essentially closed housing 34, which comprises the opening 31 at an end face 38 pointing toward the workpiece 17.

Figure 3:
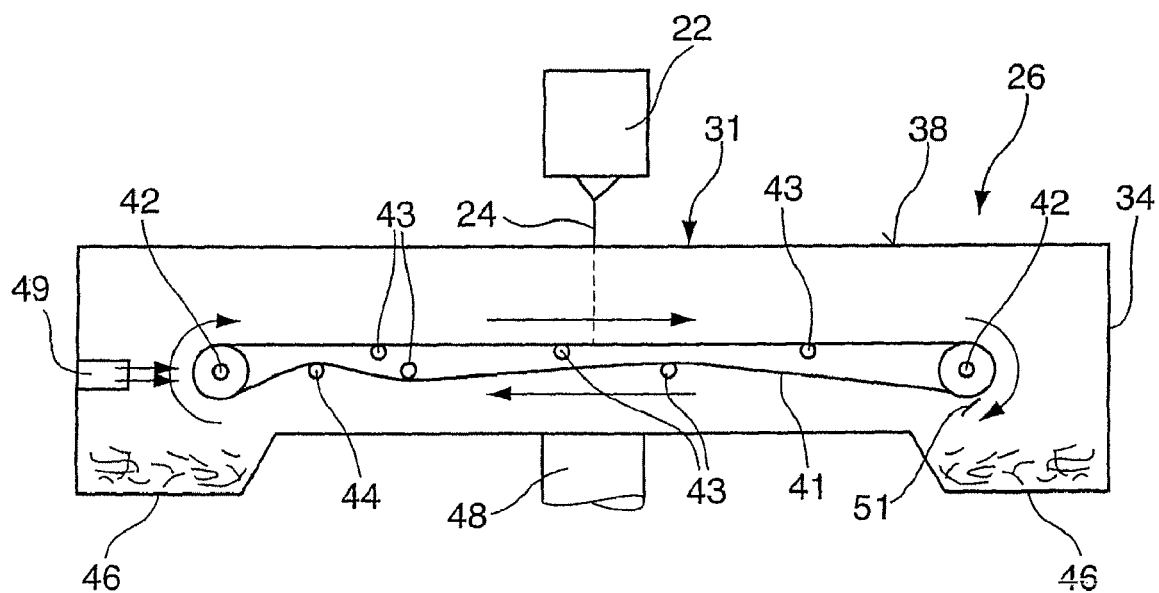
FIG. 3 shows a schematic longitudinal section of the beam-catching device according to FIG. 2.

A schematic longitudinal section of the beam-catching device 26 according to FIG. 2 is shown in FIG. 3. A circulating band 41, for example, is provided as a moving solid medium in the housing 34 of the beam-catching device 26, the circulating band 41 crossing the cutting beam 24 in order to absorb energy. This circulating band 41 is made of a material which is a good conductor of heat and/or is heat-resistant and which is always located under the beam tool or cutting head 22 during the processing. The embodiment shown in FIG. 3, by way of example, provides for this by virtue of the fact that the length of the band 41 pointing toward the opening 31 corresponds to at least the length of the opening 31. The circulating band 41 comprises deflection rollers 42 at each of its ends. Guide rollers 43 are provided in between in order to support the band 41. A tensioning roller 44 is additionally provided in order to maintain a predetermined band tension, which changes as a function of the energy absorbed. At least one of the deflection rollers 42 may also be designed as a drive roller.

Assigned to each of the deflection rollers 42 in the housing 34 is a collecting trough 46 which forms a parts/slag sump. Provided on the housing 34 is at least one extraction opening 48, which is arranged, for example, in the central region of the housing 34. This extraction opening 48 may be provided at a plurality of points of the housing 34. Likewise, a slot-shaped extraction opening (not shown) may extend partly or along an entire housing surface or may be provided on a plurality of housing surfaces. The extraction opening 48 makes it possible to not only cool the band 41 but also enables the gases and dust which are produced to be extracted by a generated vacuum. For additional cooling, at least one compressed-air feed 49 may be provided, which, for example according to FIG. 3, is assigned to the adjacent deflection roller 42 in order to achieve a counterflow for increasing the cooling effect. This at the same time makes it possible for constituents on the band surface to be blown off.

To increase the self-cleaning effect, provision is made for the deflection rollers 42 to have as small a radius as possible so that the slag possibly adhering to the surface of the band 41 breaks and automatically comes off. In addition, a scraper 51, and/or heat-resistant brushes or a slide (not shown), can preferably be provided in the region of the collecting trough 46 in order to remove other constituents from the band surface.

According to a first embodiment of the invention, provision is made for the running direction of the band 41 to be opposed to the direction of movement of the cutting head 22. Due to this control of the cutting head 22 and of the circulating band 41, the circulating band 41 cannot stop relative to the cutting beam 24 in the moving system, such that there is high energy absorption on account of the circulating band 41. Alternatively, provision may be made for the circulating band 41 to be provided in such a way as to run in the same direction as the direction of movement of the cutting head 22. In this case, provision is made for the band speed to be activated such as to be greater than the traverse speed of the cutting head 22. Furthermore, provision may be made for a combination or any desired sequence in the alternation of the directions of movement to be activated on the predetermined assumptions with respect to the direction of movement of the cutting head 22.

Alternatively, provision may be made for a band-or strip-shaped material to be provided instead of a circulating band 41, said band-or strip-shaped material performing a reciprocating movement on which a right-angled direction of movement is superimposed at the same time. Furthermore, a circulating worm or the like may alternatively be provided.

Figure 4:
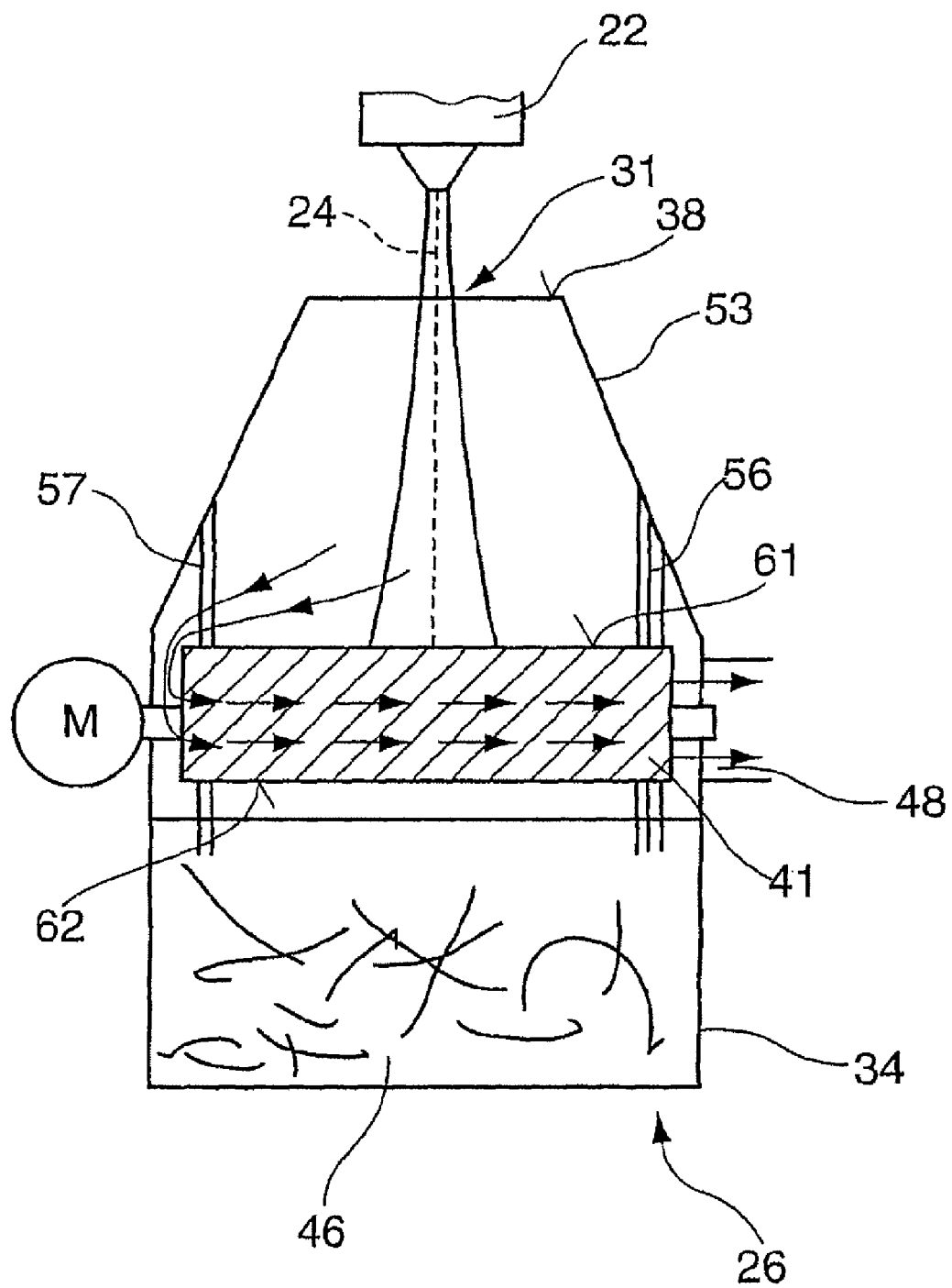
FIG. 4 shows a schematic cross-sectional view of the beam-catching device according to FIG. 2.

A schematic cross section of the beam-catching device 26 according to FIG. 3 is shown in FIG. 4. The housing 34 has inclined wall sections 53 adjoining the end face 38, said wall sections 53 extending at least up to the band 41. The adherence of slag is reduced or prevented by these oblique wall sections 53. For improved cooling, provision is made, for example, for a bristle strip 56 which has a large number of bristles to be provided along a longitudinal edge of the band 41, said bristle strip 56 forming a "tight curtain". A bristle strip 57 having a small number of bristles is provided opposite the bristle strip 56, as a result of which a type of air-permeable curtain is obtained. This makes possible a specific course of the flow according to the arrows depicted, thereby increasing the cooling of the band 41. The deflected flow between a top and a bottom band section 61, 62 can provide for optimum cooling.

Figure 5:
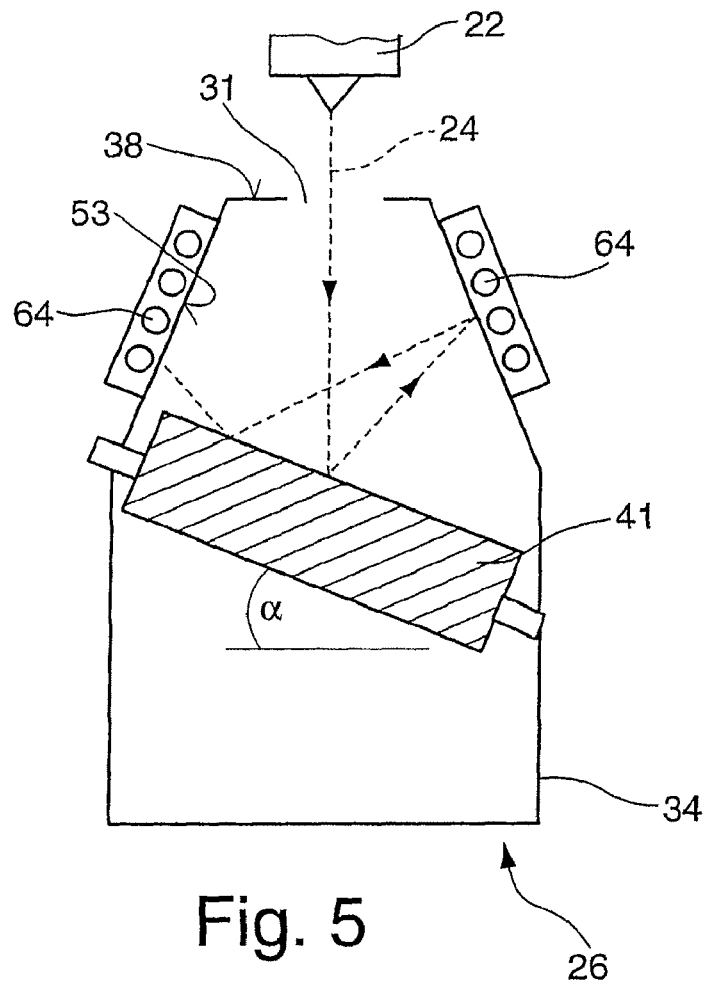
FIG. 5 shows a schematic cross sectional view of an alternative embodiment with respect to FIG. 4.

An alternative embodiment to FIG. 4 is shown in FIG. 5. In this embodiment, the circulating band 41 is inclined relative to the cutting beam 24. As a result, the cutting beam 24 is deflected in the direction of a wall section 53. The wall sections 53 comprise cooling, in particular water cooling 64, thereby making possible further energy absorption. Such an inclined arrangement of the band 41 has the advantage of the spreading of the cutting beam 24 entering the housing 34, thereby providing for further energy absorption by the cooling in addition to the energy absorption at the circulating band 41.

Figure 6:
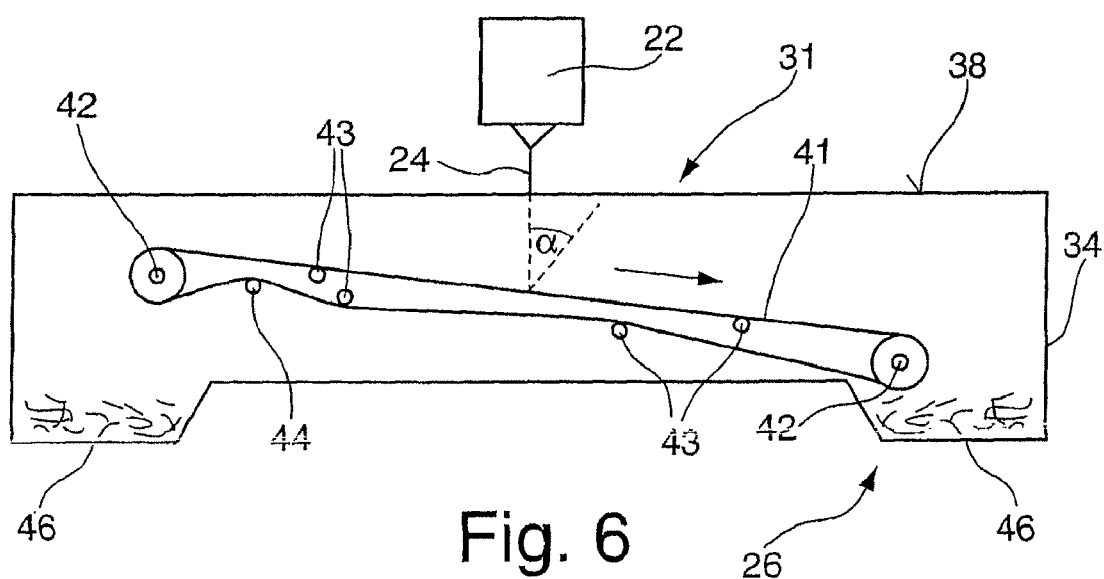
FIG. 6 shows a schematic longitudinal section of the beam-catching device with an alternative arrangement of a circulating band with respect to FIG. 3.

An alternative configuration to FIG. 4 is shown in FIG. 6. The inclination or tilting of the band 41 is effected in the direction of movement of the circulating band 41. This likewise makes possible spreading of the incoming cutting beam 24. Superimposition of the tilting arrangements according to FIGS. 5 and 6 may likewise be provided.

The beam-catching device 26 according to the invention, which is also designated as a "catcher", provides an energy absorption device which may additionally have an extraction function in order to receive and draw off the residues and scrap materials, such as slag, sparks, processing gases, etc., produced during the beam processing and the energy that is not absorbed by the workpiece 17, in order to avoid beam reflections which have an adverse effect on the cutting beam 24.

All the features of the embodiments described above can be combined with one another in any desired manner.

A number of embodiments of the invention have been described. Nevertheless, it will be understood that various modifications may be made without departing from the spirit and scope of the invention. Accordingly, other embodiments are within the scope of the following claims.

What is claimed is:

1. A beam-catching device for a cutting-beam processing machine configured to deliver a cutting beam to a workpiece, the beam-catching device comprising:
   a housing which has a line-like opening pointing toward the cutting beam, the cutting beam discharging from the underside of the workpiece during processing of the workpiece and entering the housing through the opening, and
   a circulating band disposed within the housing and configured to move relative to the opening of the housing in at least one direction crossing the cutting beam to absorb energy, wherein the opening has a predetermined length and the circulating band extends below the opening and at least partly along the predetermined length of the opening.

2. The beam-catching device as claimed in claim 1, characterized in that wall sections between the opening of the housing and the circulating band are cooled by a cooling device.

3. The beam-catching device as claimed in claim 1, characterized in that the circulating band is made of a material which is thermally conductive.

4. The beam-catching device as claimed in claim 1, characterized in that the circulating band is selected from the group consisting of metal bands, metallic chains, and metallic mesh fabrics.

5. The beam-catching device as claimed in claim 1, characterized in that the circulating band comprises a planar band having a structured surface.

6. The beam-catching device as claimed in claim 5, characterized in that the structured surface is selected from the group consisting of surfaces that are dulled and etched, surfaces having an embossed structure, corrugated surfaces and fluted surfaces.

7. The beam-catching device as claimed in claim 1, characterized in that the circulating band is guided by a plurality of guide rollers arranged between two deflection rollers and is kept under tension by at least one tensioning roller.

8. The beam-catching device as claimed in claim 1, characterized in that the circulating band is oriented essentially parallel to the opening of the housing and is configured to move in a running direction that is parallel to a direction of movement of a cutting head that delivers the cutting beam.

9. The beam-catching device as claimed in claim 1, characterized in that the circulating band is driven in a running direction against a direction of movement of a cutting head that delivers the cutting beam.

10. The beam-catching device as claimed in claim 1, characterized in that the circulating band is driven in the same direction as a direction of movement of a cutting head that delivers the cutting beam at a speed which is greater than the traverse speed of the cutting head.

11. The beam-catching device as claimed in claim 1, characterized in that the circulating band is inclined in at least one spatial direction relative to the cutting beam striking the circulating band.

12. The beam-catching device as claimed in claim 11, characterized in that the circulating band has a gradient or a slope in or against the transport direction.

13. The beam-catching device as claimed in claim 11, characterized in that the circulating band, which is oriented parallel to the opening of the housing, is tilted laterally relative to the cutting beam.

14. The beam-catching device as claimed in claim 1, characterized in that the housing has at least one extraction opening, to which an extraction device is attached.

15. The beam-catching device as claimed in claim 14, characterized in that the housing is spaced from the extraction device.

16. The beam-catching device as claimed in claim 1, characterized in that the housing comprises at least one compressed-air feed.

17. The beam-catching device as claimed in claim 16, characterized in that the compressed-air feed is configured to cool the circulating band and blows compressed air against the running direction of the circulating band.

18. The beam-catching device as claimed in claim 1, characterized in that a removal device selected from the group consisting of a scraper, a brush, and a slide is assigned to the circulating band and acts on the surface of the band.

19. The beam-catching device as claimed in claim 1, characterized in that a first bristle strip is provided at least in sections along a longitudinal edge of the circulating band, said first bristle strip having a small number of bristles per surface, and provided opposite said first bristle strip is a bristle strip which extends at least in sections and has a large number of bristles per surface.

20. A cutting-beam processing machine, the processing machine comprising:
   a cutting head configured to deliver a cutting beam to a workpiece;
   a workpiece support surface disposed below the cutting head;
   a housing, disposed below the workpiece support surface, the housing defining an elongated opening pointing toward the cutting beam, the cutting beam discharging from the underside of the workpiece during processing of the workpiece and entering the housing through the opening, and
   a circulating band disposed within the housing and configured to move relative to the opening of the housing in at least one direction crossing the cutting beam to absorb energy, wherein the opening has a predetermined length and the circulating band extends below the opening and at least partly along the predetermined length of the opening.

21. A method of processing a workpiece using a cutting-beam processing machine, the method comprising:
   delivering a cutting beam from a cutting head to a workpiece;
   supporting the workpiece on a workpiece support surface disposed below the cutting head;
   capturing the cutting beam in a housing disposed below the workpiece support surface, the housing defining an elongated opening pointing toward the cutting beam, the cutting beam discharging from the underside of the workpiece during processing of the workpiece and entering the housing through the opening; and
   providing a circulating band disposed within the housing and configured to move relative to the opening of the housing in at least one direction crossing the cutting beam to absorb energy, wherein the opening has a predetermined length and the circulating band extends below the opening and at least partly along the predetermined length of the opening.

* * * * *